(12) United States Patent
Oguri

(10) Patent No.: US 11,458,618 B2
(45) Date of Patent: Oct. 4, 2022

(54) COLLABORATIVE OPERATION SUPPORT DEVICE

(71) Applicant: FANUC CORPORATION, Yamanashi (JP)

(72) Inventor: Kenichiro Oguri, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 300 days.

(21) Appl. No.: 16/513,709

(22) Filed: Jul. 17, 2019

(65) Prior Publication Data
US 2020/0039066 A1 Feb. 6, 2020

(30) Foreign Application Priority Data
Aug. 3, 2018 (JP) .............................. JP2018-146907

(51) Int. Cl.
*B25J 9/16* (2006.01)
*G06T 7/73* (2017.01)
*G10L 15/22* (2006.01)

(52) U.S. Cl.
CPC ........... *B25J 9/1602* (2013.01); *B25J 9/1664* (2013.01); *B25J 9/1689* (2013.01); *B25J 9/1697* (2013.01); *G06T 7/73* (2017.01); *G10L 15/22* (2013.01)

(58) Field of Classification Search
CPC ...... B25J 9/1602; B25J 9/1697; B25J 9/1664; B25J 9/1689; B25J 9/1656; B25J 9/0081; B25J 9/1661; B25J 19/023; B25J 19/04; B25J 9/023; B25J 9/04; B25J 9/045; B25J 9/046; B25J 18/007; B25J 18/04; G06T 7/73; G06T 2207/10016; G06T 19/006; G06T 13/205; G06T 13/40; G10L 15/22; Y02P 90/02; G05B 2219/35503;
(Continued)

(56) References Cited

U.S. PATENT DOCUMENTS 5,687,295 A * 11/1997 Kaihori .................. B25J 9/1656
700/264
9,760,261 B2 * 9/2017 Yahaba .................. G06F 3/0488
(Continued)

FOREIGN PATENT DOCUMENTS

DE         10305384 A1    8/2004
DE    102005009437 A1    9/2006
(Continued)

*Primary Examiner* — Abby Y Lin
*Assistant Examiner* — Esvinder Singh
(74) *Attorney, Agent, or Firm* — Hauptman Ham, LLP

(57) ABSTRACT

The collaborative operation support device includes a display device including a display area; and a processor configured to detect, based on an image in which the operator or the robot is represented, a position of a section of the robot in the display area when the operator looks at the robot through the display area, the section associated with an operation mode of the robot specified by means of an input device; select, in accordance with the specified operation mode of the robot, display data corresponding to the specified mode among display data stored in a memory; and display the selected display data in the display area of the display device in such a way that the selected display data is displayed at a position that satisfies a certain positional relationship with the position of the section of the robot in the display area.

13 Claims, 5 Drawing Sheets

(58) Field of Classification Search
CPC ........ G05B 2219/39451; G05B 19/423; G05B 2219/32014; G05B 2219/39449; G05B 23/0256
See application file for complete search history.

(56) References Cited

U.S. PATENT DOCUMENTS

| | | | |
|---|---|---|---|
| 2014/0275760 A1* | 9/2014 | Lee .................. | A61B 34/30 600/102 |
| 2016/0257000 A1* | 9/2016 | Guerin ............... | B25J 9/1605 |
| 2018/0132814 A1* | 5/2018 | Noda .................. | A61B 6/54 |
| 2018/0317725 A1* | 11/2018 | Lee .................... | A47L 11/202 |
| 2020/0055195 A1* | 2/2020 | Ignakov ............. | B25J 13/08 |
| 2021/0170603 A1* | 6/2021 | Kotlarski ........... | B25J 9/1666 |

FOREIGN PATENT DOCUMENTS

| | | |
|---|---|---|
| DE | 102012110508 A1 | 5/2013 |
| DE | 102015015503 A1 | 6/2016 |
| EP | 2769810 A2 | 8/2014 |
| JP | S63-28586 A | 2/1988 |
| JP | H7295625 A | 11/1995 |
| JP | H9216183 A | 8/1997 |
| JP | 2000288432 A | 10/2000 |
| JP | 2004243516 A | 9/2004 |
| JP | 2006-289543 A | 10/2006 |
| JP | 2012171024 A | 9/2012 |
| JP | 2015147259 A | 8/2015 |
| JP | 2016107379 A | 6/2016 |
| JP | 20188347 A | 1/2018 |

\* cited by examiner

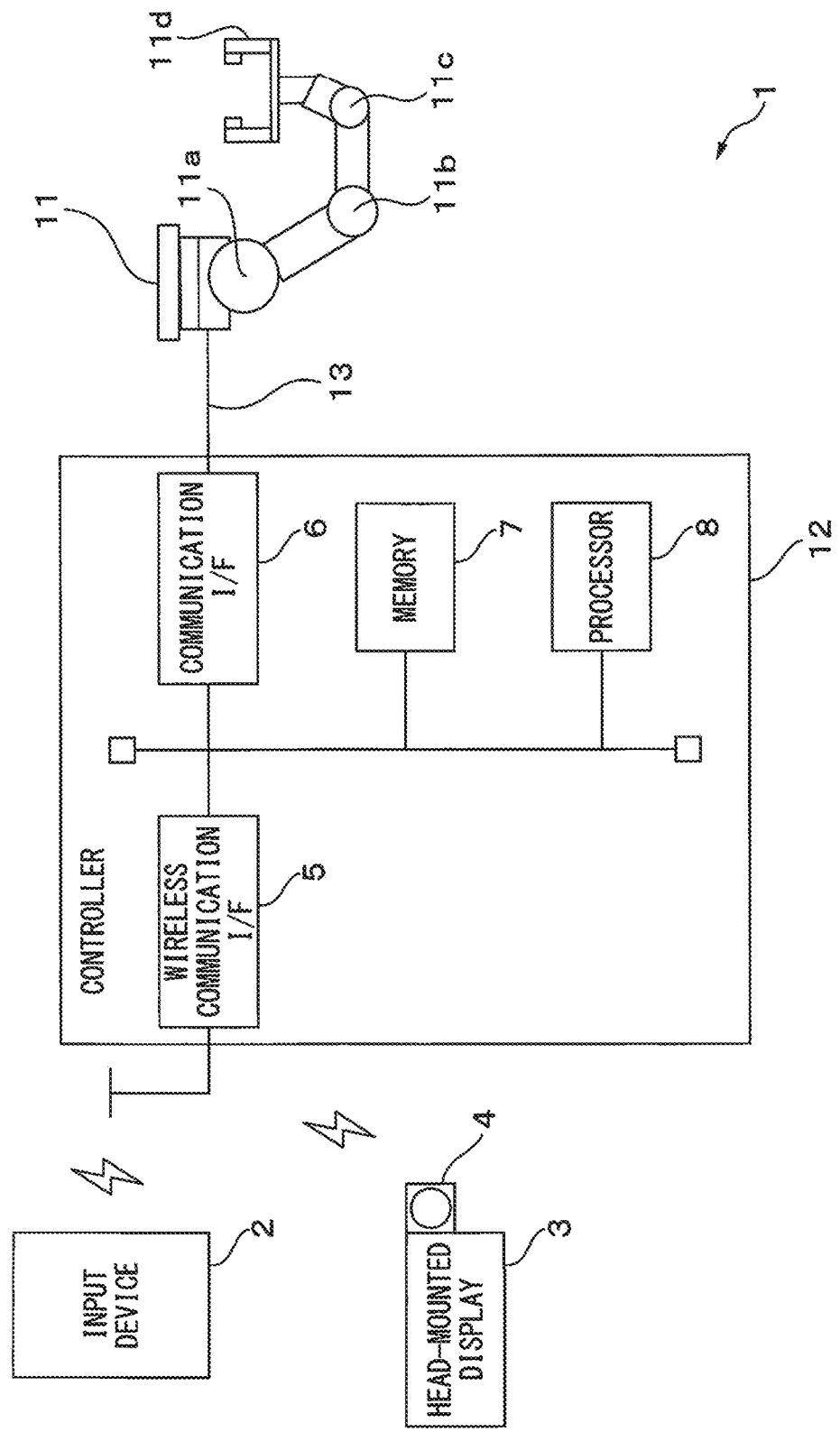

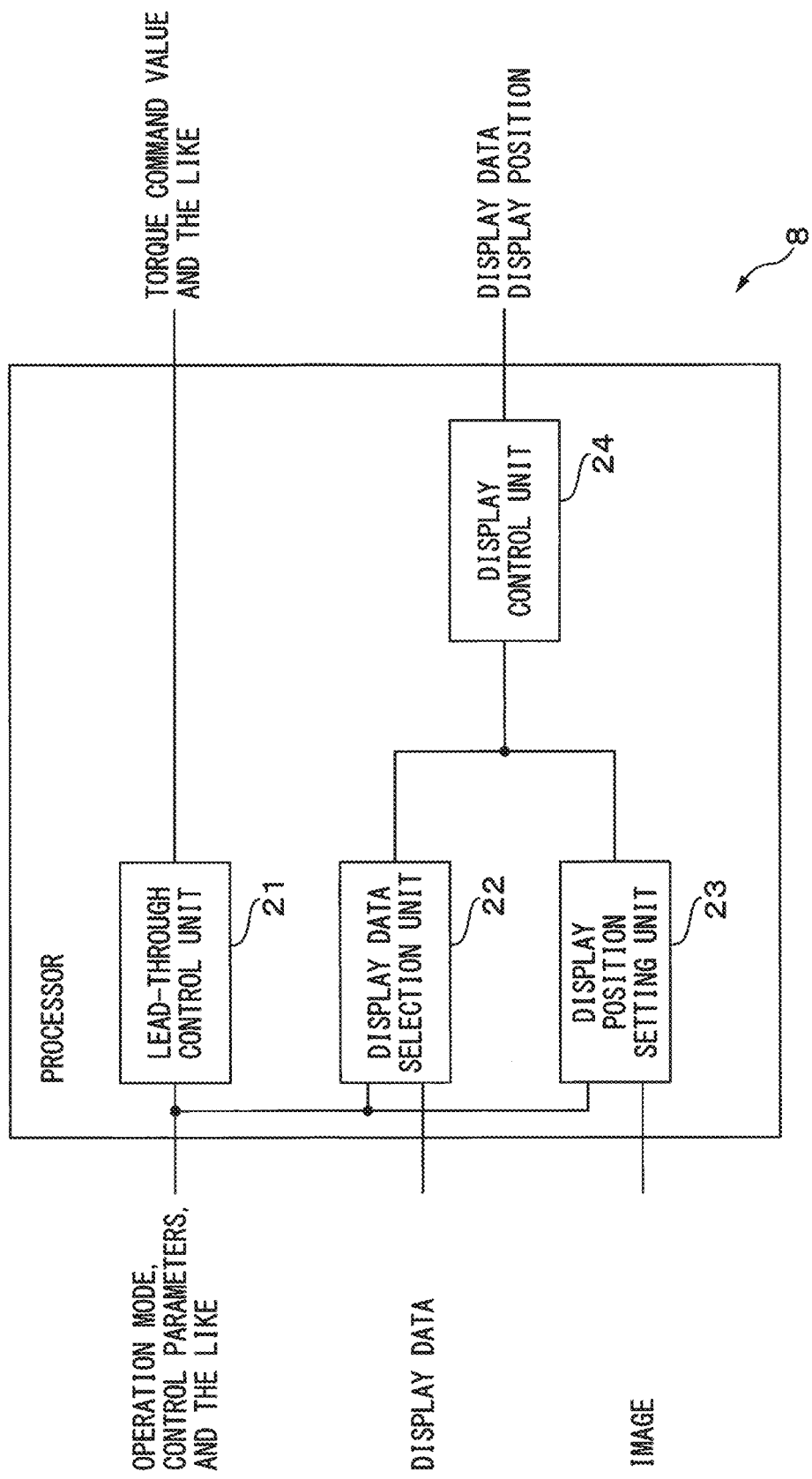

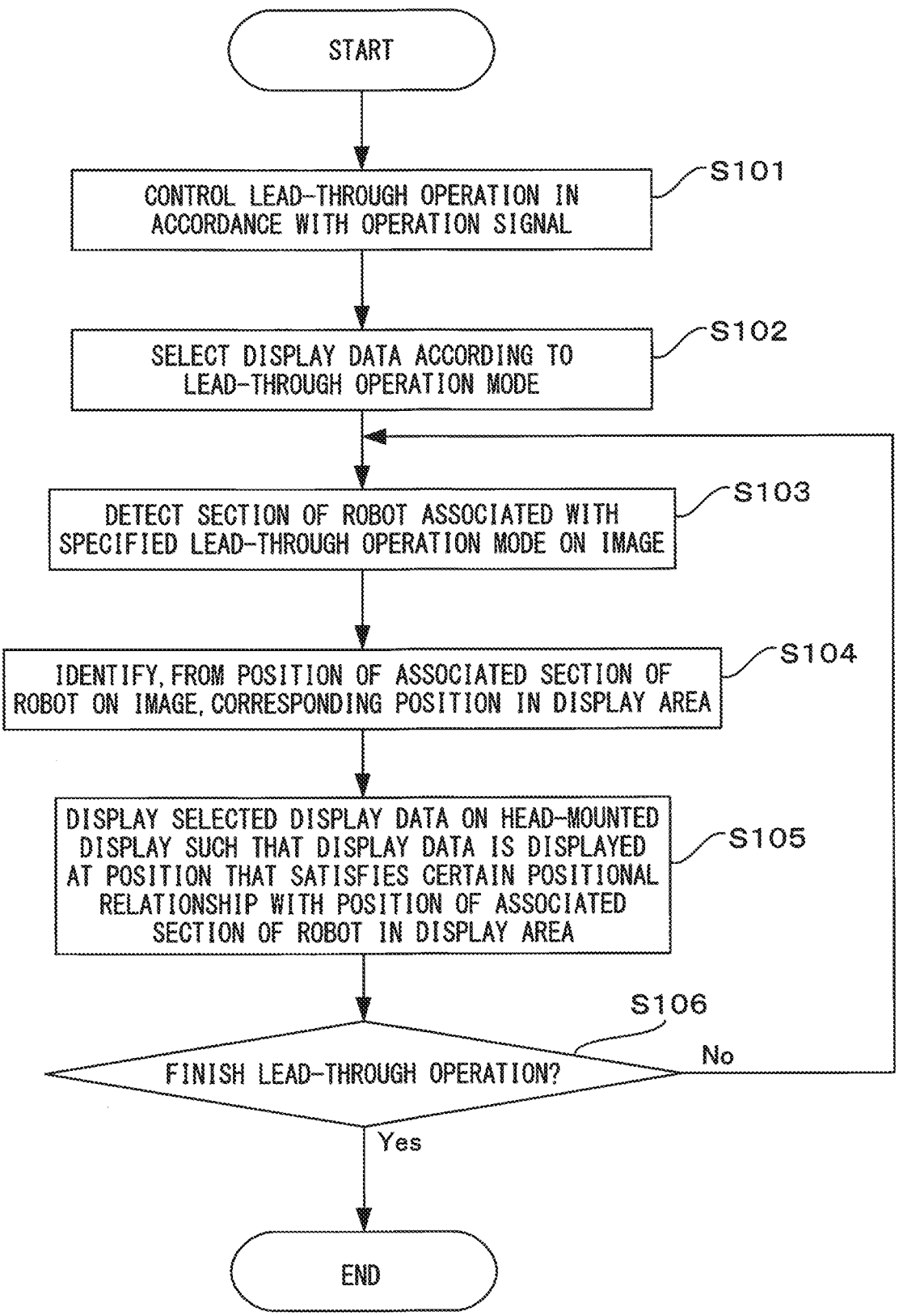

COLLABORATIVE OPERATION SUPPORT DEVICE

RELATED APPLICATIONS

The present application claims priority of Japanese Application Number 2018-146907, filed Aug. 3, 2018, the disclosure of which is hereby incorporated by reference herein in its entirety.

FIELD

The present invention relates to, for example, a collaborative operation support device for supporting a collaborative operation with a robot.

BACKGROUND

When an operator teaches a robot which includes a movable part driven by a servo motor such as an arm about an operation to be implemented by the robot, or when such a robot and the operator work in cooperation, the operator may cause the robot to implement a lead-through operation by manually changing a position or posture of the robot.

When the operator teaches the robot about the operation by means of a lead-through operation, the operator typically operates an input device called a teach pendant in order to confirm settings for movements of the robot or input control parameters for setting movements of the robot. However, to operate the teach pendant, the operator needs to temporarily stop the ongoing task, thereby reduces an operation efficiency. In view of this problem, there has been proposed a technique in which a keyword or phrase for instructing a robot about an operation are extracted from an operator's speech, and using the keyword or phrase, data for instructing the robot, about the operation are created (see, for example, Japanese Unexamined Patent Publication (Kokai) No. 2006-289543).

SUMMARY

However, even with the technique described above, it is not easy for the operator to intuitively understand how the robot will actually move for the control parameters that have been set. For example, even if a certain value of viscosity is set for a predetermined direction that is defined with a tool attached to the robot at the origin, it is difficult for the operator to intuitively understand which direction the predetermined direction is oriented in a real space and what extent movements of the robot is changed by the value of viscosity that has been set.

In one aspect, it is an object to provide a collaborative operation support device that facilitates an operator to intuitively understand settings for movements of a robot.

According to one embodiment, the collaborative operation support device is provided. The collaborative operation support device includes: a memory configured to store, for each operation mode of a robot when the robot and an operator collaboratively operate with each other, display data representing movements of the robot for the mode; a display device configured to be worn by the operator, wherein the operator can view the robot through a display area of the display device; a camera configured to image the robot or the operator and generate an image in which the robot or the operator is represented; and a processor configured to detect, based on the image, a position of a section of the robot in the display area when the operator looks at the robot through the display area, the section associated with an operation mode of the robot specified by means of an input device; select, according to the specified operation mode of the robot, display data corresponding to the specified mode among the display data stored in the memory; and display the selected display data in the display area of the display device in such a way that the selected display data is displayed at a position that satisfies a certain positional relationship with the position of the section of the robot in the display area.

BRIEF DESCRIPTION OF DRAWINGS

FIG. 1 is a schematic configuration diagram of a collaborative operation support device according to one embodiment.

FIG. 2 is a functional block diagram of a processor relating to a collaborative operation support process.

FIG. 5 is an operation flowchart of the collaborative operation support process.

DESCRIPTION OF EMBODIMENTS

Figure 3A:
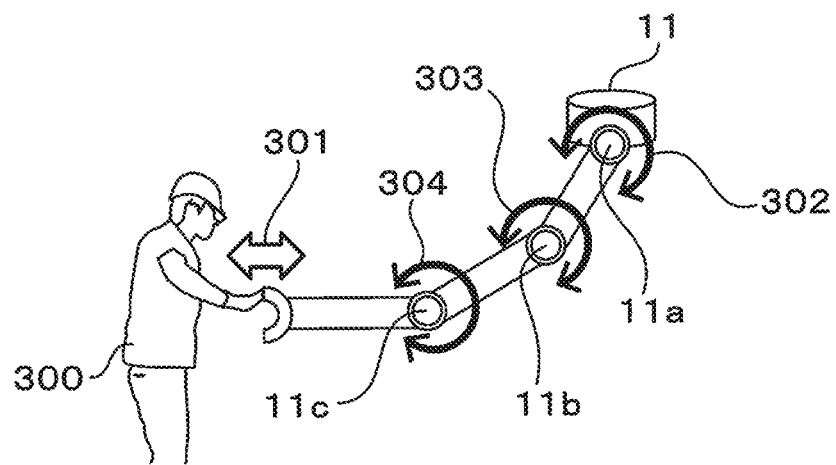
FIG. 3A is a diagram illustrating an example of modes of lead-through operations.

With reference to the drawings, a collaborative operation support device will be described below. The collaborative operation support device displays, on a transparent display worn by an operator, display data with respect to a robot that collaboratively operates with the operator, the display data representing movements of the robot in a specified operation mode, in association with a section of the robot associated with the specified operation mode, thereby facilitating the operator to intuitively understand settings for the movements of the robot.

FIG. 1 is a schematic configuration diagram of the collaborative operation support device. The collaborative operation support device 1 includes an input device 2, a head-mounted display 3, a camera 4, a wireless communication interface 5, a communication interface 6, a memory 7, and a processor 8. Among these units, the wireless communication interface 5, the communication interface 6, the memory 7, and the processor 8 are mounted in a controller 12 of a robot 11, which is a target for teaching or works in cooperation with the operator, for example. The wireless communication interface 5, the communication interface 6, and the memory 7 are connected to the processor 8 via a signal line in a bi-directionally communicative fashion. In addition, each of the input device 2, the head-mounted display 3, and the camera 4 is communicatively connected to the processor 8 via the wireless communication interface 5 by means of wireless communication compliant with a predetermined wireless communication standard such as Bluetooth (registered trademark).

In this example, the robot 11 is an articulated robot including three shafts 11a to 11c and a tool 11d is attached to an end of the robot 11. Each of the shafts 11a to 11c of the robot 11 is driven by a servo motor (not illustrated) to change a posture of the robot 11. Note that the robot 11 that collaboratively operates with the operator is not limited to this example, and the robot 11 may be a robot including at least one shaft driven by a servo motor.

The input device 2 is an input device that can be carried by the operator such as a so-called teach pendant, and is used for inputting information on settings for movements of the robot 11. For this purpose, the input device 2 includes, for example, a plurality of operation buttons, a control circuit for generating an operation signal corresponding to the operation button that has been pressed among the plurality of operation buttons, a wireless communication circuit for generating a radio signal containing the operation signal generated by the control circuit and transmitting the radio signal to the controller 12. The input device 2 generates, in response to an operation by the operator, an operation signal indicating whether or not to cause the robot 11 to implement a lead-through operation, a mode of the lead-through operation, and values of various types of control parameters for controlling the servo motors for driving the respective shafts in the lead-through operation implemented by the robot 11, and transmits a radio signal containing the operation signal to the controller 12.

The head-mounted display 3 is an example of a display unit, and displays, for the operator, display data received from the controller 12 and representing movements of the robot 11 in the lead-through operation implemented by the robot 11 by superimposing the display data on a field of view of the operator in a state in which the head-mounted display 3 is worn on the operator's head. For this purpose, the head-mounted display 3 includes a transparent display such as, for example, a liquid crystal display; a mounting member for arranging the transparent display in such a way that the transparent display overlaps the field of view of the operator when the head-mounted display 3 is worn on the operator's head; a wireless communication circuit for wirelessly communicating with the controller 12; and a control circuit for displaying the display data contained in the radio signal received from the controller 12 on the transparent display and transmitting an image received from the camera 4 to the controller 12 via the wireless communication circuit.

The camera 4 is an example of an imaging unit, and is attached to the head-mounted display 3 in such a way that, for example, the camera 4 can image the field of view of the operator when the operator wears the head-mounted display 3. The camera 4 is attached to the head-mounted display 3, for example, laterally to or above the transparent display of the head-mounted display 3 in such a way that the camera 4 is oriented in the front direction of the operator who is wearing the head-mounted display 3. The camera 4 is communicatively connected, for example, to the control circuit of the head-mounted display 3. While the collaborative operation support device 1 is performing a collaborative operation support process, the camera 4 images a shooting range including the field of view of the operator who is wearing the head-mounted display 3 at predetermined imaging periods to generate images, and outputs the generated images to the control circuit of the head-mounted display 3.

The wireless communication interface 5 includes a circuit for performing a process of transmitting/receiving a radio signal compliant with the predetermined wireless communication standard, and the like. The wireless communication interface 5 extracts an operation signal or information such as images contained in the radio signals received from the input device 2 and the head-mounted display 3, and passes the signal or information to the processor 8. In addition, the wireless communication interface 5 generates a radio signal containing the data to be displayed on the head-mounted display 3, which have been received from the processor 8, and transmits the generated radio signal to the head-mounted display 3.

The communication interface 6 includes, for example, a communication interface for connecting the controller 12 to a communication line 13 and a circuit for performing a process of transmitting/receiving a signal via the communication line 13, and the like. The communication interface 6 outputs, for example, a torque command value for the servo motor of the robot 11, which has been received from the processor 8, and the like to the robot 11 via the communication line 13. In addition, the communication interface 6 receives, from the robot 11 via the communication line 13, information indicating operation statuses of the respective servo motors such as values of feedback current at the respective servo motors, encoder signals from respective encoders indicating rotation amounts of the respective shafts 11a to 11c driven by the servo motors, and passes the information to the processor 8.

The memory 7 is an example of a storage unit, and includes, for example, a readable/writable semiconductor memory and a read-only semiconductor memory. The memory 7 may further include a storage medium such as a semiconductor memory card, a hard disk, or an optical storage medium and a device for accessing the storage medium.

The memory 7 stores various types of computer programs for controlling the robot 11, a computer program for the collaborative operation support process, and the like, which are executed by the processor 8. The memory 7 also stores display data which is displayed on the head-mounted display 3 and represents movements of the robot 11 for each lead-through operation mode, and the like, in association with the corresponding lead-through operation mode. In addition, the memory 7 stores information indicating operation statuses of the respective servo motors, which can be obtained from the robot 11 while the robot 11 is operating, various types of data generated in the collaborative operation support process, images obtained from the camera 4, and the like.

The processor 8 is an example of a control unit, and includes a Central Processing Unit (CPU) and a peripheral circuit thereof. The processor 8 may further include a processor for numeric operations. The processor 8 controls the entire collaborative operation support device 1. In addition, the processor 8 controls the movements of the robot 11 and performs the collaborative operation support process.

FIG. 2 is a functional block diagram of the processor 8 relating to the collaborative operation support process. The processor 8 includes a lead-through control, unit 21, a display data selection unit 22, a display position setting unit 23, and a display control unit 24. Each of these units included in the processor 8 is, for example, a functional module achieved by a computer program executed by the processor 8. Alternatively, each of these units may be achieved as a dedicated arithmetic circuit implemented as part of the processor 8.

The lead-through control unit 21 is an example of an operation control unit and controls the movements of the robot 11 based on whether or not to cause the robot 11 to implement a lead-through operation, the mode of the lead-through operation, or the values of the control parameters specified in the operation signal contained in the radio signal received from the input device 2 via the wireless communication interface 5.

The lead-through operation will be described hereafter.

Figure 3B:
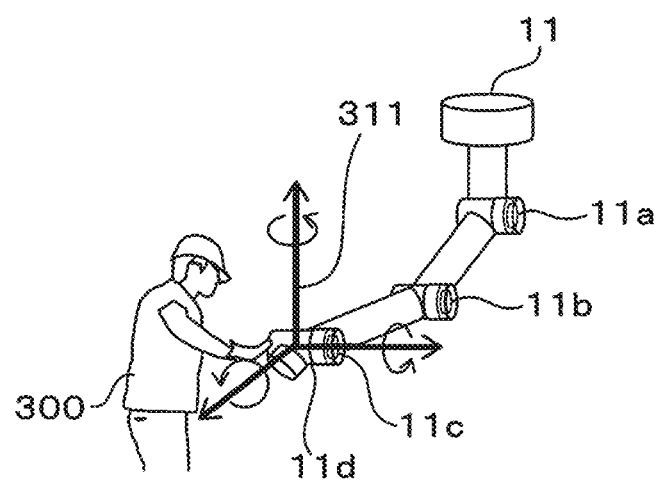
FIG. 3B is a diagram illustrating another example of modes of lead-through operations.

FIG. 3A and FIG. 3B are diagrams each illustrating an example of modes of lead-through operations. In the operation mode illustrated in FIG. 3A, the robot 11 operates in such a way that the shafts 11a to 11c of the respective joints of the robot 11 move in accordance with external forces applied to the shafts 11a to 11c of respective joints. For example, in FIG. 3A, as indicated by an arrow 301, in response to pushing an end of the robot 11 by operator 300, the shafts 11a to 11c of the respective joints of the robot 11 rotates as indicated by arrows 302 to 304. Hereinafter, for the sake of convenience, the operation mode illustrated in FIG. 3A is referred to as the each shaft lead-through mode.

In contrast, in the operation mode illustrated in FIG. 3B, the robot 11 operates in such a way that, in accordance with an external force applied to any position of the robot 11, an orthogonal coordinate system set for the position moves. For example, as illustrated in FIG. 3B, by applying a force to the tool 11d attached to the end of the robot 11 by the operator 300, any shaft of the shafts 11a to 11c of the respective joints, e.g. the shaft 11c to which the tool 11d is attached rotates in such a way that an orthogonal coordinate system 311 set for the tool 11d moves in accordance with the direction of the force. Hereinafter, for the sake of convenience, the operation mode illustrated in FIG. 3B is referred to as the orthogonal lead-through mode.

Note that, in the each shaft lead-through mode, any shaft of the robot 11 may be fixed. In the orthogonal lead-through mode, movements in any axial direction in the orthogonal coordinate system or movements about any axis in the orthogonal coordinate system may be fixed.

In addition, in a lead-through operation, in order to set the movements of the robot 11 by means of the input device 2, virtual viscosity, elasticity, and/or inertia for the respective shafts 11a to 11c of the robot 11 or rotation speeds for the respective shafts 11a to 11c to be applied in a situation in which the robot 11 is moving may be set as the control parameters for the servo motors.

The lead-through control unit 21 determines a shaft to be fixed in accordance with the lead-through operation mode specified in the operation signal, designation of a shaft to be fixed, and the like. When the operator applies an external force to the robot 11, the lead-through control unit 21 rotates, in response to the external force, shafts other than the one to be fixed in accordance with the specified lead-through operation mode. In the process, the lead-through control unit 21 determines, in accordance with the values of virtual viscosity, elasticity, and/or inertia for the respective shafts contained in the operation signal (when the values of viscosity and the like are not contained in the operation signal, a value set in the past or a default value), the torque command value for the servo motor that drives the shaft. In this case, for example, the lead-through control unit 21 refers to a table representing a relationship between combinations of the values of the virtual viscosity, elasticity, and/or inertia and torque command values to determine the torque command value. Such a table is stored in advance, for example, in the memory 7. Alternatively, the lead-through control unit 21 may calculate the torque command value in accordance with an equation representing the relationship between combinations of the values of the virtual viscosity, elasticity, and/or inertia and torque command values. The lead-through control unit 21 then outputs the torque command value to the robot 11 via the communication interface 6 and the communication line 13 and causes the servo motors that drive the respective shafts other than the one to be fixed to generate torques having magnitude equivalent to the values of the virtual viscosity, elasticity, and/or inertia. The servo motors may be controlled by means of a Proportional-Integral-Derivative (PID) controller in accordance with the actual torque generated by the external force that the operator applied to the robot 11 and the torque specified by the torque command value. Furthermore, the lead-through control unit 21 outputs control values for the servo motors indicating rotation speeds that have been set (e.g., a duty cycle in pulse width modulation) to the robot 11 via the communication interface 6 and the communication line 13.

The lead-through control unit 21 may calculate rotation amounts of the respective shafts by counting the number of times that the encoder signals from the encoders attached to the respective shafts or the servo motors that drive the respective shafts are received. The lead-through control unit 21 can calculate a posture of the robot 11 at a time of interest based on the posture of the robot 11 at the time when the robot 11 started to move and the rotation amounts of the respective shafts at the time of interest.

The display data selection unit 22 selects, among display data for the respective operation modes stored in the memory 7, display data to be displayed on the head-mounted display 3 in accordance with the lead-through operation mode specified by the operation signal. For this purpose, for example, the display data selection unit 22 selects, by referring to a table representing a relationship between the lead-through operation modes and display data, display data corresponding to the lead-through operation mode specified in the operation signal. For example, in the each shaft lead-through mode, display data representing a symbol (e.g., an arc-like arrow) indicating the direction of rotation of a shaft is selected for each shaft while in the orthogonal lead-through mode, display data representing a symbol (e.g., a combination of a straight line arrow representing each axis of the orthogonal coordinate system and an arc-like arrow around the straight line arrow for each axis) indicating the orthogonal coordinate system is selected. Subsequently, the display data selection unit 22 reads out the selected display data from the memory 7.

The display data selection unit 22 may change the display data in accordance with the values of the control parameters (e.g., the values of viscosity, elasticity, inertia, the rotation speed, or the like) contained in the operation signal. For example, the display data selection unit 22 may set luminance of the arrow specified in the display data to a higher value as the values of virtual viscosity, elasticity, and/or inertia that have been set are higher. Alternatively, the display data selection unit 22 may set a color, a thickness, a length, or transparency of the arrow specified in the display data to a higher value in accordance with the values of virtual viscosity, elasticity, and/or inertia that have been set. When the control parameters for the respective shafts of the robot 11 are set to different values, the display data may be changed for each shaft in accordance with the values of the control parameters set for the shaft.

Furthermore, when any shaft of the shafts 11a to 11c included in the robot 11 is to be fixed, the display data selection unit 22 may read out display data indicating the shaft to be fixed from the memory 7.

The display data selection unit 22 passes the selected display data read out from the memory 7 to the display control unit 24.

The display position setting unit 23 sets a position for displaying the display data selected by the display data selection unit 22 in a display area of the transparent display of the head-mounted display 3. For example, in the each shaft lead-through mode, it is preferable to display a symbol representing a direction of rotation of a shaft of the robot 11 that is not fixed around the shaft. In the orthogonal lead-through mode, it is preferable to display a symbol representing an orthogonal coordinate system at a specified position at which the orthogonal coordinate system is to be located. Thus, the display data representing the movements of the robot 11 is preferably displayed in association with the section of the robot 11 associated with the specified lead-through operation mode in such a way as to facilitate understanding of movable portions of the robot 11 in the lead-through operation. Therefore, when the collaborative operation support process is started, the display position setting unit 23 detects, every time an image is obtained from the camera 4 after the process is started, a section or sections of the robot 11 associated with the specified lead-through operation mode in the obtained image. For example, when the specified lead-through operation mode is the each shaft lead-through mode, the display position setting unit 23 detects the respective shafts of the robot 11 on the image. When the specified lead-through operation mode is the orthogonal lead-through mode, the display position setting unit 23 detects a position of the robot 11 at which an orthogonal coordinate system is to be located, for example, the tool 11d attached to an end of the robot 11. For this purpose, the display position setting unit 23 detects, by performing template matching, for each section to be detected of the robot 11, on the image using a template representing the section, an area in which the section to be detected is represented on the image. Mote that such a template is stored in advance, for example, in the memory 7. In this case, the display position setting unit 23 may use different templates in the template matching according to the posture of the robot 11 viewed from the operator. The display position setting unit 23 may determine, for each section to be detected, a posture of the section represented in a template that best matches the image among the templates for the section as the posture of the section viewed from the operator. Alternatively, the display position setting unit 23 may input an image to a classifier that has been learned in advance in such a way as to detect the section to be detected of the robot 11, to detect the area in which the section of the robot 11 is represented on the image. The display position setting unit 23 may use, as such a classifier, a classifier such as a deep neural network or AdaBoost.

In the present embodiment, the camera 4 is attached to the head-mounted display 3 in such a way that the shooting range thereof covers the field of view of the operator who wears the head-mounted display 3. The position at which a certain object is captured in the image acquired by the camera 4 is associated in a one-to-one manner with a position at which the certain object is to be superimposed on the display area of the transparent display when the operator sees the certain object through the transparent display of the head-mounted display 3. Therefore, the display position setting unit 23 can obtain, for each detected section of the robot 11, by referring to a table representing a relationship between positions in the image acquired by the camera 4 and positions in the display area of the transparent display of the head-mounted display 3, the position in the display area corresponding to a centroid position of the area in which the detected section is captured in the image acquired by the camera 4 as the position of the section in the display area. Such a table is stored in advance, for example, in the memory 7. Alternatively, the display position setting unit 23 may obtain the position of the detected section in the display area, instead of using such a table, by inputting coordinates of the centroid of the area in which the detected section is captured in the image to a position conversion equation representing a correspondence relationship between positions in the image acquired by the camera 4 and positions in the display area of the transparent display of the head-mounted display 3.

The display position setting unit 23 performs the process described above every time an image is obtained from the camera 4, to update the positions of respective sections associated with the specified lead-through operation mode in the display area. In this manner, even if the operator moves or changes an orientation of his/her face during the lead-through operation, the display position setting unit 23 can display, for each of sections of the robot 11 associated with the specified lead-through operation mode, the display data representing the movements of the robot 11 in the specified lead-through operation mode with respect to the section on the head-mounted display 3 in such a way that the display data is displayed at a position that satisfies certain positional relationship with the section.

The display position setting unit 23 informs the display control unit 24, every time an image is obtained from the camera 4, of the positions of the respective sections of the robot 11 associated with the specified lead-through operation mode.

The display control unit 24 displays, for each of sections of the robot 11 associated with the specified lead-through operation mode, the display data representing the movements in the specified lead-through operation mode with respect to the section on the head-mounted display 3 in such a way that the display data is displayed at a position that satisfies the certain positional relationship with the section. For example, the display control unit 24 set, for each of the sections of the robot 11 associated with the specified lead-through operation mode, the position of the display data corresponding to the section in the display area in such a way that the position of the display data satisfies the certain positional relationship with the position of the section in the display area. The display control unit 24 then transmits, for each of the sections of the robot 11 associated with the specified lead-through operation mode, a signal containing the display data corresponding to the section and the display position of the display data to the head-mounted display 3 via the wireless communication interface 5.

Figure 4A:
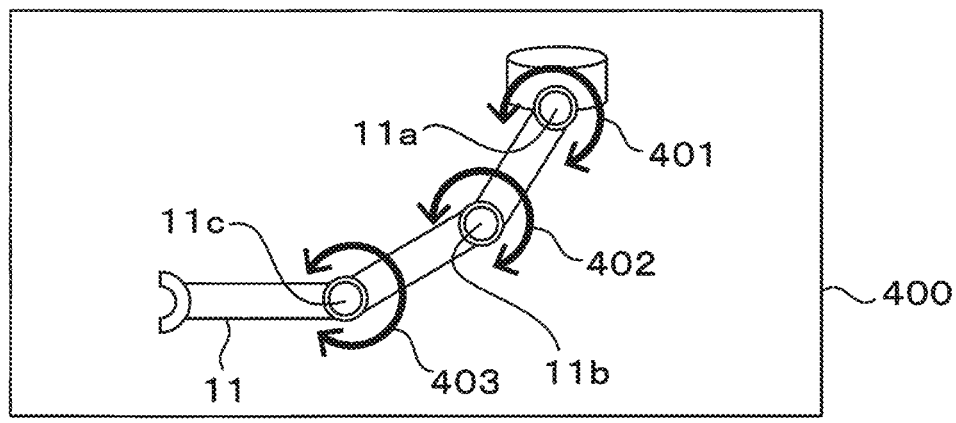
FIG. 4A is a diagram illustrating an example of display data for the each shaft lead-through mode, displayed on a head-mounted display.

FIG. 4A is a diagram illustrating an example of the display data for the each shaft lead-through mode, displayed on a head-mounted display 3. In the example illustrated in FIG. 4A, the respective shafts 11a to 11c of the robot 11 are movable portions in a display area 400 of the head-mounted display 3, and therefore, arc-like arrows 401 to 403 representing directions of rotation of the respective shafts are displayed for the respective shafts 11a to 11c in such a way as to encircle the shafts at the center.

Note that, when any shaft of the shafts 11a to 11c is to be fixed, the display data representing the movements of the robot 11 need not be displayed for the shaft to be fixed. For example, when the shaft 11a is fixed, the arc-like arrow 401 around the shaft 11a need not be displayed. In this manner, the operator can intuitively understand the shaft to be fixed and the shafts not to be fixed in the lead-through operation.

Alternatively, the display control unit 24 may display, with respect to the shaft to be fixed, display data indicating that the shaft does not move. For example, when the shaft 11a is fixed, the display control unit 24 may display an X-shaped symbol at the position in the display area corresponding to the shaft 11a. In this case, when an absolute value of the actual torque of the servo motor for the shaft to be fixed, which is obtained via the communication interface 6, is greater than a predetermined value indicating that an external force is applied, the display control unit 24 may display the display data indicating that the shaft does not move. In this manner, the display control unit 24 decreases the number of display data to be superimposed on the field of view of the operator to keep the operator free from feeling complexity, and the display control unit 24 further facilitates the operator to intuitively understand the shaft to be fixed when the operator moves the robot 11.

Figure 4B:
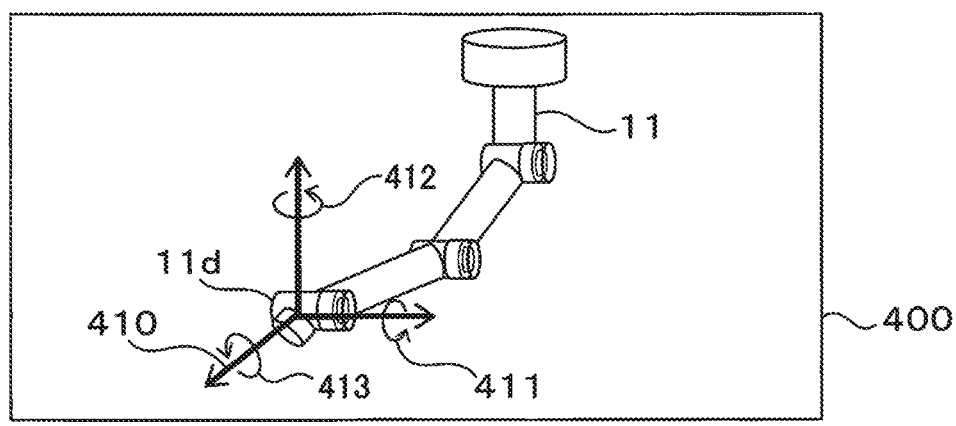
FIG. 4B is a diagram illustrating an example of display data for an orthogonal lead-through mode, displayed on the head-mounted display.

FIG. 4B is a diagram illustrating an example of display data for the orthogonal lead-through mode, displayed on the head-mounted display 3. In the example illustrated in FIG. 4B, an orthogonal coordinate system is set at the position of the tool 11a attached to the robot 11, and therefore, in the display area 400 of the head-mounted display 3, an orthogonal coordinate system 410 is displayed with the position in the display area corresponding to the tool 11d at the origin and arc-like arrows 411 to 413 are displayed about the respective axes of the orthogonal coordinate system.

In this example, the display control unit 24 need not display, with respect to the axis to be fixed of the orthogonal coordinate system, an arrow indicating the axis. Alternatively, the display control unit 24 may set luminance for the axis to be fixed of the orthogonal coordinate system to be lower than luminance for the axes not to be fixed of the orthogonal coordinate system. Alternatively, the display control unit 24 may set transparency for the axis to be fixed of the orthogonal coordinate system to be higher than transparency for the axes not to be fixed of the orthogonal coordinate system.

Figure 4C:
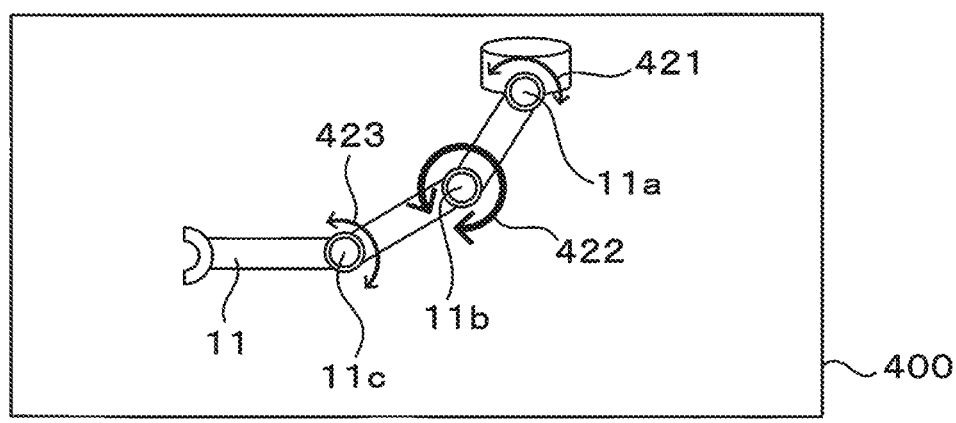
FIG. 4C is a diagram illustrating an example of display data, in the each shaft lead-through mode, displayed on the head-mounted display when values of control parameters for servo motors for respective shafts differ from each other.

FIG. 4C is a diagram illustrating an example of the display data, in the each shaft lead-through mode, displayed on the head-mounted display 3 when the values of the control parameters for the servo motors for the respective shafts such as virtual viscosity, elasticity and/or inertia are different. In the example illustrated in FIG. 4C, the respective shafts 11a to 11c of the robot 11 are movable portions, and therefore in the display area 400 of the head-mounted display 3 arc-like arrows 421 to 423 representing directions of rotation of the respective shafts 11a to 11c are displayed with respect to each of the shafts 11a to 11c in such a way as to encircle the shafts at the center. In addition, in this example, thickness of each arrow is changed in accordance with the values of the virtual viscosity, elasticity and/or inertia that have been set. For example, when the value of viscosity set for the shaft 11b is greater than those set for the shafts 11a and 11c, the arrow 422 displayed around the shaft 11b is displayed with a thickness greater than that of the arrow 421 displayed around the shaft 11a and that of the arrow 423 displayed around the shaft 11c. In this manner, the operator can intuitively understand that the rotation movement of the shaft 11b is more elastic than those of the shafts 11a and 11c. Thus, by changing the display data in response to the values of the control parameters set for the servo motors for the respective shafts, the operator can intuitively understand the control parameters to be set.

FIG. 5 is an operation flowchart of the collaborative operation support process. The processor 8 performs the collaborative operation support process in accordance with the operation flowchart described below, for example, every time the processor 8 receives the operation signal from the input device 2.

The lead-through control unit 21 controls the lead-through operation implemented by the robot 11 in accordance with the operation signal from the input device 2 (step S101). The display data selection unit 22 selects, among the display data stored in the memory 7, display data to be displayed on the head-mounted display 3 in accordance with the lead-through operation mode specified in the operation signal (step S102).

The display position setting unit 23 detect, in the image obtained from the camera 4, a section of the robot 11 associated with the specified lead-through operation mode (step S103). The display position setting unit 23 then identifies, from the position of the detected section of the robot 11 in the image, a position of the section in the display area of the head-mounted display 3 (step S104).

The display control unit 24 displays, for the section of the robot 11 associated with the specified lead-through operation mode, selected display data on the head-mounted display 3 in such a way that the display data is displayed at a position that satisfies a certain positional relationship with the position of the section in the display area of the head-mounted display 3 (step S105).

After step S105, the processor 8 determines whether or not the processor 8 has received, from the input device 2, an operation signal indicating that the lead-through operation is to be finished (step S106). When the processor 8 has not received the operation signal indicating that the lead-through operation is to be finished (step S106—No), the processor 8 repeats the processing steps from step S103. When the processor 8 has received the operation signal indicating that the lead-through operation is to be finished (step S106—Yes), the processor 8 ends the collaborative operation support process.

As described above, when the collaborative operation support device causes the robot to implement the lead-through operation, the collaborative operation support device displays the display data representing the movements of the robot in the specified lead-through operation mode on the head-mounted display worn by the operator in association with a section of the robot associated with the specified lead-through operation mode. Therefore, the collaborative operation support device can facilitate the operator to intuitively understand the settings for the movements of the robot that implements the lead-through operation.

According to a variation, the display control unit 24 may use, as the display data, an image of the section of the robot 11, which is captured in the image obtained from the camera 4 and associated with the specified lead-through operation mode, for example, a contour image of the section. In this case, the display control unit 24 crops the image by removing an area other than the area in which the section is captured, the section being detected by the display position setting unit 23 and being associated with the specified lead-through operation mode. The display control unit 24 performs an edge detection process on the remaining area after cropping using an edge detection filter such as a Sobel filter, to detect an edge pixel having an edge strength of a predetermined value or greater. The display control unit 24 then detects, for each row of pixels in the remaining area, the leftmost edge pixel and the rightmost edge pixel as contour pixels representing a contour of the section associated with the specified lead-through operation mode. Subsequently, the display control unit 24 may generate a contour image in which each contour pixel has a pixel value different from those of other pixels as display data.

In this case, the display control unit 24 may change the size of the contour image in accordance with the values of the control parameters for the servo motors for the respective shafts of the robot 11. For example, the display control unit 24 may enlarge the contour image in such a way that the size of the contour image is larger as the value of virtual viscosity or elasticity is higher. In this manner, the operator can visually know, from the size of the section of the robot 11 associated with the specified lead-through operation mode, the control parameters that have been set for the section, and thus, the operator can intuitively understand the control parameters that have been set.

According to another variation, the lead-through control unit 21 of the processor 8 may change the values of the control parameters that have been set for the section associated with the display data when the operator points a finger at a position that overlaps the display data displayed on the head-mounted display 3 over a certain period of time (e.g., one to two seconds). For example, when the operator points a finger at an end of the arrow 401 illustrated in FIG. 4A in a clockwise direction over a certain period of time, the lead-through control unit 21 may increase the virtual viscosity for the shaft 11*a* by a certain value; on the other hand, when the operator points a finger at an end of the arrow 401 illustrated in FIG. 4A in a counterclockwise direction over a certain period of time, the lead-through control unit 21 may decrease the value of virtual viscosity for the shaft 11*a* by a certain value.

For this purpose, an area is set in the display data for changing the values of the control parameters by a certain value when the operator points a finger at a point within the area (e.g., each end of the arrow 401 in FIG. 4A). In addition, the lead-through control unit 21 detects, in the image acquired by the camera 4, the operator's finger. For example, the lead-through control unit 21 detects, by inputting the image to a classifier that has been learned for detecting a finger in advance, an area in the image in which the finger is captured, and determines a centroid of the area as a position of the finger. The lead-through control unit 21 may use, as such a classifier, a classifier such as a deep neural network or AdaBoost. As described with respect to the display position setting unit 23, positions in the image acquired by the camera 4 correspond to positions in the display area of the head-mounted display 3 in a one-to-one manner. Therefore, the lead-through control unit 21 may perform a process similar to the process performed by the display position setting unit 23 to calculate a position in the display area corresponding to the position of the finger detected in the image, and when the position in the display area is within the area set for changing the control parameters, the lead-through control unit 21 may change the values of the control parameters by a value set for the area.

According to this variation, the operator need not operate the input device 2 to change the control parameters, and thus, an operation efficiency is improved.

According to another variation, the display control unit 24 may display a movement trajectory of the section of the robot 11 associated with the specified lead-through operation mode on the head-mounted display 3. In this case, while a rotation amount of any shaft of the robot 11, which is calculated on the basis of the encoder signal received from the robot 11 via the communication interface 6 with respect to the shaft is changing, i.e., while the posture of the robot 11 is changing, every time the display control unit 24 obtains an image from the camera 4, the display control unit 24 obtains, from the display position setting unit 23, position in the display area of the section of the robot 11 associated with the specified lead-through operation mode. The display control unit 24 then displays a line obtained by connecting the obtained positions in time order as the movement trajectory on the head-mounted display 3.

Note that a sensor that can measure an amount indicating a change in the orientation of the operator's face, such as a gyroscope sensor, may be attached to the head-mounted display 3 in such a way that an accurate movement trajectory can be displayed even if the operator changes the orientation of his/her face during a series of tasks. In this case, the head-mounted display 3 measures the amount indicating the change in the orientation of the operator's face by the sensor at every a predetermined period, and transmits a radio signal containing the amount to the controller 12. The display control unit 24 calculates, every time the display control obtains an image from the camera 4, a displacement of the orientation of the operator's face between the time of the previous image acquisition and the time of the most recent image acquisition on the basis of the amount indicating the change in the orientation of the operator's face, which is contained in the radio signal received via the wireless communication interface 5. For example, when the amount indicating the change in the orientation of the operator's face is represented by an angular acceleration, the display control unit 24 can calculate the displacement of the orientation of the operator's face by calculating double integral of the angular acceleration. The display control unit 24 may move the positions in the display area of the section of the robot 11 associated with the specified lead-through operation mode at time when respective images were acquired, by an amount equivalent to the displacement of the orientation of the operator's face using, as the reference, the position at the time when the most recent image was acquired.

According to still another variation, the camera 4 may be attached, for example, facing downward on a ceiling of a room where the robot 11 is installed in such a way that a position of the operator relative to the robot 11 can be detected. A sensor that can measure an amount indicating the change in the orientation of the operator's face, such as a gyroscope sensor, may be attached to the head-mounted display 3. In addition, the position of the robot 11 in a real space is stored in the memory 7 in advance. In this case, for example, when the operator performs an input operation by operating the input device 2 to cause the robot 11 to start implementing a lead-through operation, the operator gazes at a certain position of the robot 11 (e.g., the tool 11*d* attached to the robot 11) over a certain period of time (e.g., three to five seconds) for initialization. When the lead-through control unit 21 of the processor 8 receives, from the input device 2, an operation signal indicating that implementation of the lead-through operation by the robot 11 is to be started, the lead-through control unit 21 controls the servo motor in such a way that the robot 11 has a predetermined posture set in advance. When the display position setting unit 23 of the processor 8 receives, from the input device 2, the operation signal indicating that implementation of the lead-through operation by the robot 11 is to be started, the display position setting unit 23 detects the operator in the image obtained by imaging made by the camera 4 during the certain period of time. For example, the display position setting unit 23 detects, by inputting the image to a classifier that has been learned for detecting an operator in advance, a centroid of an area in which the operator is captured in the image. The display position setting unit 23 may use, as such a classifier, a classifier such as a deep neural network or AdaBoost. The position in the image corresponds to a direction from the camera 4 in a one-to-one manner. In addition, since a distance from the camera 4 to a floor on which the robot 11 and the operator are located is known, the display position setting unit 23 can identify, on the basis of the position of the centroid of the area in the image, in which the operator is captured, a position of the operator in a real space (hereinafter, referred to as an initial position). Therefore, the display position setting unit 23 can identify a relative positional relationship between the robot 11 and the operator. In addition, since the posture of the robot 11 during the period in which the operator is gazing at the certain position of the robot 11 is known, a gaze direction of the operator to the certain position of the robot 11 in a case where the operator is located at the initial position is also known. Therefore, the display position setting unit 23 sets an intersection point between the gaze direction and the display area of the head-mounted display as a reference point.

After the initialization, the head-mounted display 3 measures the amount indicating the change in the orientation of the operator's face by the sensor at every a predetermined period, and transmits a radio signal containing the amount to the controller 12. The display position setting unit 23 of the processor 8 calculates a displacement of the orientation of the operator's face from the time when the operator is gazing at the certain position on the basis of the amount indicating the change in the orientation of the operator's face, which is contained in the radio signal received via the wireless communication interface 5. For example, when the amount indicating the change in the orientation of the operator's face is represented by an angular acceleration, the display position setting unit 23 can calculate the displacement of the orientation of the operator's face by calculating double integral of the angular acceleration. The display position setting unit 23 can detect, by detecting the position of the operator in the image acquired by the camera 4 in a similar manner as described above, a movement direction and an amount of movement of the operator from the initial position. In addition, the display position setting unit 23 can calculate a change in the posture of the robot 11 from the predetermined posture from the rotation amounts of the respective shafts. Therefore, the display position setting unit 23 can calculate, on the basis of the movement direction and the amount of movement of the operator from the initial position, the displacement of the orientation of the operator's face from the orientation of the operator's face at the time point when the operator located at the initial position is gazing at the certain position of the robot 11, and the amount of the change in the posture of the robot 11 from the predetermined posture, angles of directions from the operator toward the respective movable portions of the robot 11 relative to the front direction of the operator. The display position setting unit 23 may identify, on the basis of the angles, positions of the respective movable portions in the display area of the head-mounted display 3.

According to still another variation, the display data selection unit 22 may change the selected display data in accordance with movements of the robot 11 generated by the external force applied by the operator to the robot 11. For example, the display data selection unit 22 may change, in response to values of the actual torque, received from the robot 11 via the communication interface 6, of the servo motors of the respective shafts 11a to 11c of the robot 11, a color or luminance of the arrow in the display data with respect to each shaft. Alternatively, the display data selection unit 22 may calculate, for each of the shafts 11a to 11c of the robot 11, based on the rotation amount for the shaft, which is calculated on the basis of the encoder signals received from the robot 11 via the communication interface 6, and a rotation range for the shaft a remaining rotation amount for which the shaft can be still rotated, and shorten a length of the arrow in the display data as the remaining rotation amount is smaller. Alternatively, the display data selection unit 22 may blink the arrow in the display data with respect to a shaft for which the absolute value of the actual torque of the servo motor received from the robot 11 via the communication interface 6 is equal to or greater than a predetermined value, among the shafts 11a to 11c of the robot 11. In this manner, the operator can more easily understand movements of the robot 11.

According to still another variation, the input device 2 may include a speech input unit such as a microphone in such a way that the operator can change the values of the control parameters with speech. The input device 2 transmits a radio signal containing a speech signal representing speech of the operator obtained by the speech input unit to the controller 12. Alternatively, the speech input unit may be attached to the head-mounted display 3, and the radio signal containing the speech signal representing the speech of the operator obtained by the speech input unit may be transmitted from the head-mounted display 3 to the controller 12. The lead-through control unit 21 of the processor 8 of the controller 12 may perform a certain speech recognition process such as word spotting techniques based on hidden Markov models on the speech signal contained in the radio signal received via the wireless communication interface 5 to recognize the speech of the operator, and according to a result of the speech recognition, the lead-through control unit 21 may change the values of the control parameters or the lead-through operation mode to be specified. In this manner, the operator can reduce time and effort for operating the input device 2 and improve the operation efficiency.

All examples and specific terms used herein are intended for an instructive purpose to facilitate readers to understand the present invention and a concept contributed by the inventor of the present invention for promoting the technique, and should not be construed as limited to such specific examples and conditions described herein and any configurations in such examples, which are related to describing superiority and inferiority of the present invention. Although the embodiments of the present invention have been described in detail, it should be understood that various changes, substitutions, and alterations may be made without departing from the spirit and scope of the present invention.

What is claimed is:

1. A collaborative operation support device, comprising:
a memory configured to store, for each operation mode of a robot including at least one rotatably mounted shaft, when the robot and an operator collaboratively operate with each other, display data which represents movements of the robot for the mode and includes a symbol representing rotation of the at least one shaft and a symbol representing a coordinate system set at a certain position of the robot;
a display device configured to be worn by the operator, wherein the operator can view the robot through a display area of the display device;
a camera configured to image the robot or the operator and generate an image in which the robot or the operator is represented; and
a processor configured to
detect, based on the image, a position of a section of the robot in the display area when the operator looks at the robot through the display area, the section associated with an operation mode of the robot specified by an input device;

select, according to the specified operation mode of the robot, display data corresponding to the specified mode among the display data stored in the memory; and cause the display device to display the selected display data in the display area in such a way that the selected display data is displayed at a position that satisfies a certain positional relationship with the position of the section of the robot in the display area, wherein the processor is configured to cause the display device to display, in the display area, the symbol representing rotation of the at least one shaft when the specified operation mode of the robot is a first operation mode in which any shaft of the at least one shaft rotates in accordance with an external force applied to the robot, the processor is configured to cause the display device to display, in the display area, the symbol representing the coordinate system when the specified operation mode of the robot is a second operation mode in which a position or an orientation of the coordinate system is changed in accordance with the external force applied to the robot, the at least one shaft of the robot includes two or more shafts which are rotatable or fixed independently from each other, the display data selected and displayed for a rotatable shaft among the two or more shafts are different from the display data selected and displayed for a fixed shaft among the two or more shafts, and the display data selected and displayed for the fixed shaft among the two or more shafts indicate that the fixed shaft does not move.

2. The collaborative operation support device according to claim 1, wherein, when the specified operation mode of the robot is the second operation mode, the processor is configured to detect a position of the robot in the display area, at which the coordinate system is set, as the position of the section of the robot, and cause the display device to display the symbol representing the coordinate system in such a way that the symbol is superimposed on the certain position in the display area.

3. The collaborative operation support device according to claim 1, wherein the robot includes a servo motor configured to drive the at least one rotatably mounted shaft, and wherein the processor is configured to change the selected display data in accordance with a value, set by the input device, of a control parameter for controlling the servo motor.

4. The collaborative operation support device according to claim 1, wherein the camera is attached to the display device and configured to image a field of view of the operator, and wherein the processor is configured to detect an area in which the section of the robot is represented on the image, and detect, based on a positional relationship between a position of the area in the image and the corresponding position in the display area, the position of the section of the robot in the display area.

5. The collaborative operation support device according to claim 1, wherein the processor is configured to change the selected display data in response to movements of the robot generated by the external force applied to the robot.

6. The collaborative operation support device according to claim 1, wherein the robot includes a servo motor configured to drive the at least one rotatably mounted shaft, and the camera is attached to the display device and configured to image a field of view of the operator, and wherein the processor is further configured to detect a finger of the operator in the image, and change a value of a control parameter for controlling the servo motor associated with the display data when a position in the display area corresponding to a position of the finger of the operator in the image overlaps with the display data displayed in the display area.

7. The collaborative operation support device according to claim 1, wherein the processor is configured to cause the display device to display a movement trajectory of the section of the robot in the display area.

8. The collaborative operation support device according to claim 1, wherein the robot includes a servo motor configured to drive the at least one rotatably mounted shaft, and the collaborative operation support device further comprises a microphone configured to generate a speech signal representing speech of the operator, and wherein the processor is further configured to recognize the speech of the operator contained in the speech signal, and change a value of a control parameter for controlling the servo motor or change an operation mode of the robot, based on the recognized speech of the operator.

9. The collaborative operation support device according to claim 1, wherein the processor is configured to detect, based on the image, a position of each of the two or more shafts of the robot in the display area when the operator looks at the robot through the display area, the position associated with the operation mode of the robot specified by the input device, and cause the display device to display the selected display data in the display area in such a way that the display data selected for each of the two or more shafts of the robot are displayed at a position that satisfies a certain positional relationship with said each of the two or more shafts in the display area.

10. The collaborative operation support device according to claim 1, wherein the processor is further configure to cause the display device to not display an arrow indicating an axis to be fixed in the coordinate system.

11. The collaborative operation support device according to claim 1, wherein the processor is further configure to set luminance for an axis to be fixed in the coordinate system to be lower than luminance for axes not to be fixed in the coordinate system.

12. The collaborative operation support device according to claim 1, wherein the processor is further configure to set transparency for an axis to be fixed in the coordinate system to be higher than transparency for axes not to be fixed in the coordinate system.

13. A collaborative operation support device, comprising:
a memory configured to store, for each operation mode of a robot including at least one rotatably mounted shaft, when the robot and an operator collaboratively operate with each other, display data which represents movements of the robot for the mode and includes a symbol representing rotation of the at least one shaft and a symbol representing a coordinate system set at a certain position of the robot;

a display device configured to be worn by the operator, wherein the operator can view the robot through a display area of the display device;

a camera configured to image the robot or the operator and generate an image in which the robot or the operator is represented; and a processor configured to detect, based on the image, a position of a section of the robot in the display area when the operator looks at the robot through the display area, the section associated with an operation mode of the robot specified by an input device;

select, according to the specified operation mode of the robot, display data corresponding to the specified mode among the display data stored in the memory; and cause the display device to display the selected display data in the display area in such a way that the selected display data is displayed at a position that satisfies a certain positional relationship with the position of the section of the robot in the display area, wherein the processor is configured to cause the display device to display, in the display area, the symbol representing rotation of the at least one shaft when the specified operation mode of the robot is a first operation mode in which any shaft of the at least one shaft rotates in accordance with an external force applied to the robot, the processor is configured to cause the display device to display, in the display area, the symbol representing the coordinate system when the specified operation mode of the robot is a second operation mode in which a position or an orientation of the coordinate system is changed in accordance with the external force applied to the robot, the robot includes a servo motor configured to drive the at least one rotatably mounted shaft, the processor is configured to change the selected display data in accordance with a value, set by the input device, of a control parameter for controlling the servo motor, the control parameter for controlling the servo motor comprises one or more of virtual viscosity, elasticity and inertia, the symbol representing rotation of the at least one shaft includes at least one corresponding arrow, and the processor is further configure to change a thickness of each arrow in accordance with values of one or more of the virtual viscosity, elasticity and inertia that have been set.

* * * * *